Jan. 5, 1965  K. G. KING  3,164,760
CONTROL FOR VARIABLE SPEED ELECTRICAL MOTOR SYSTEMS
Filed Sept. 21, 1961

United States Patent Office 3,164,760
Patented Jan. 5, 1965

3,164,760
CONTROL FOR VARIABLE SPEED ELECTRICAL MOTOR SYSTEMS
Kenneth G. King, London, England, assignor to Westinghouse Brake and Signal Company Limited, London, England
Filed Sept. 21, 1961, Ser. No. 139,765
Claims priority, application Great Britain, Oct. 27, 1960, 36,870/60
5 Claims. (Cl. 318—72)

This invention relates to a control system for use with a variable speed motor system in which an induction motor is supplied with power from an inverter whose output frequency can be varied to cause a variation in the speed of rotation of the induction motor.

In a variable speed motor system of this nature, the torque exerted by the motor depends upon the difference between the frequency of the power supply from the inverter and the frequency corresponding to the speed of rotation of the motor, referred to hereinafter for convenience as the "motor frequency," the difference between the two frequencies being referred to as the "slip frequency."

The torque available from the motor is at a maximum when the slip frequency is at a critical value, which, for example, may be between 2 c./s. and 3 c./s., the torque falling to zero as the slip frequency falls to zero.

In practice, therefore, for any given speed of the motor in the range of, say 0–3000 r.p.m., the output frequency of the inverter, and thus the repetition frequency of the triggering pulses applied to the inverter must be determined with great accuracy, say to within 0.25 c./s., if approximately maximum torque is to be obtained from the motor.

If the slip frequency is too low, the torque is greatly reduced, whilst if it is too high, the torque is again reduced and the motor may lose control of the load owing to the reversal of the slope of its torque/speed curve.

It is an object of the present invention to provide an improved control system for a variable speed electrical motor system in which the above requirements may be obtained.

The present invention consists in a control system for a variable speed motor system in which an induction motor is supplied with power from an inverter having a variable frequency output, wherein triggering pulses for the inverter are arranged to be derived from, or controlled by, the output from a control device having one component arranged to be rotated at the same speed as, or at a speed proportional to, the speed of rotation of motor, and another component arranged to be rotated by a servo-motor, the output of the control device having a frequency which is proportional to the sum of the speeds of rotation of the two components, or speeds proportional thereto.

Figure 1:
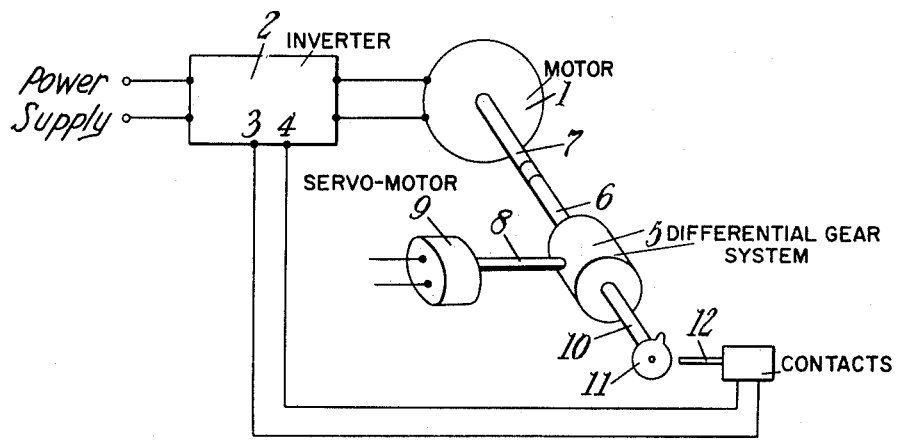
Figure 2:
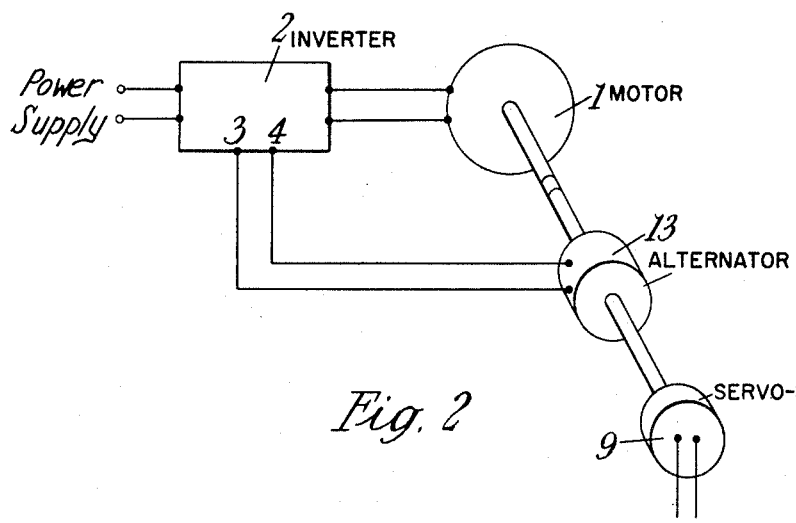

In the accompanying drawings:
FIGURE 1 shows diagrammatically one form of control system according to the present invention, and
FIGURE 2 shows an alternative form of control system according to the present invention.

In carrying the invention into effect according to one convenient mode by way of example, as shown in FIGURE 1, a control system is provided for a variable speed motor system in which an induction motor 1 is supplied with power from an inverter 2 whose output frequency may be varied by varying the frequency or repetition rate of pulses applied to the terminals 3, 4 of the inverter.

The control system includes a control device 5 in the form of a differential gear system. The input shaft 6 of this gear system is coupled to the shaft 7 of the induction motor, whilst the cage is driven by the shaft 8 of the servo-motor 9 so that the output shaft 10 of the gear system will then be rotated at a speed which is the sum of speeds proportional to the speeds of rotation of the induction motor 1 and the servo-motor 9.

The output shaft 10 of the differential gear system is arranged to drive a contact making system comprising a cam 11 positioned on the output shaft to operate a pair of spring contacts 12, which contacts are arranged to control the triggering of the inverter 2.

In this way, the desired frequency of the inverter triggering pulses may be controlled to a high degree of accuracy by varying the speed of the servo-motor 9 by any suitable means (not shown).

In an alternative arrangement, as shown in FIGURE 2, the control device consists of an alternator 13 having a permanent magnet rotor. The rotor of the alternator 13 is driven by the shaft 7 of the induction motor 1 and the "stator" in this case arranged to be rotated by the servo motor 9. If the induction motor 1 is a four-pole machine, in which one revolution corresponds to two cycles of the supply, and if the inverter 2 requires six triggering pulses per cycle, then the alternator 13 must produce twelve pulses per revolution of the induction motor 1.

If now the slip frequency of the induction motor 1 for maximum torque is 2 c./s., corresponding to one revolution per second, then the stator of the alternator 13 must be rotated by the servo motor 9 at 1 revolution per second to obtain maximum torque, by adding 12 c./s. to the output pulse frequency of the alternator, regardless of the actual speed of the induction motor 1.

It will be appreciated that the speed of the motor under load will be determined by the torque/speed characteristics of the load, the motor adopting a speed corresponding to the torque provided by the system as determined by the chosen slip frequency. Under these conditions, a different speed may be obtained by changing the slip frequency so that the torque is changed and the motor drives the load on a different portion of its torque/ speed characteristics.

The servo-motor may be controlled directly to obtain direct control of the output torque of the induction motor, the torque varying from zero to maximum as the alternator stator speed is varied from 0–1 revolution per second, or, alternatively, the servo-motor may be controlled by an error-signal in a closed loop automatic speed control system of conventional type, the speed of the servo-motor being limited to give a maximum of 1 revolution per second at the alternator stator in order to ensure that the induction motor is not operated on the wrong part of its torque/speed characteristic.

The control device may also consist of any other form of pulse generator in which the pulses are generated by direct electrical contact, by photoelectric, capacitative or magnetic pick up means, or by any other suitable means.

Various modifications may be made within the scope of the present invention.

What I claim is:

1. A control system for a variable speed motor system comprising an induction motor, an inverter connected to supply a variable frequency output to said induction motor, a servo-motor, a control device having a first component and a second component, means for rotating said first component at a first speed dependent upon the speed of said induction motor, means for rotating said second component at a second speed dependent upon the speed of said servo-motor, said control device being arranged to provide an output having a frequency dependent upon the sum of said first and second speeds, and means for triggering said inverter at a frequency dependent upon said output frequency of the control device.

2. A motor control system comprising an induction motor, an inverter connected to supply an output to said induction motor, a servo-motor, a first member, means for rotating said first member at a first speed dependent upon the speed of said induction motor, a second member, means for rotating said second member at a second speed dependent upon the speed of said servo-motor, means for deriving an output having a frequency dependent upon the sum of said first and second speeds, and means for triggering said inverter at a frequency dependent upon said output frequency.

3. A motor control system comprising an induction motor, an inverter connected to supply a variable frequency output to said induction motor, a servo-motor, a differential gear system having an input shaft, an output shaft, and a cage, means for rotating said input shaft at a first speed dependent upon the speed of said induction motor, and means for rotating said cage at a second speed dependent upon the speed of said servo-motor, whereby said output shaft is rotated at an output speed dependent upon the sum of said first and second speeds, and means for deriving triggering pulses for said inverter from said output shaft so as to trigger said inverter at a frequency dependent upon said output speed.

4. A motor control system comprising an induction motor, an inverter connected to supply a variable frequency output to said induction motor, a servo-motor, an alternator having a permanent magnet rotor, a stator component and an output, means for rotating said permanent magnet rotor at a first speed dependent upon the speed of said induction motor and means for rotating said stator component at a second speed dependent upon the speed of said servo-motor, whereby said alternating output is dependent upon the sum of said first and second speeds, and means for triggering said inverter at a frequency dependent upon the frequency of said alternator output.

5. A motor control system comprising an induction motor, an inverter connected to supply a variable frequency output to said induction motor, a servo-motor, an alternator having a permanent magnet rotor, a stator component and an output, means for rotating said permanent magnet rotor at a first speed dependent upon the speed of said induction motor and means for rotating said stator component at a second speed dependent upon the speed of said servo-motor, whereby said alternating output is dependent upon the sum of said first and second speeds, means for triggering said inverter at a frequency dependent upon the frequency of said alternator output, and means for controlling the speed of the servo-motor in accordance with the speed of the induction motor so as to provide a closed loop automatic speed control system.

No references cited.

ORIS L. RADER, *Primary Examiner.*

JOHN F. COUCH, *Examiner.*